(12) United States Patent
Yoshida et al.

(10) Patent No.: US 8,010,283 B2
(45) Date of Patent: Aug. 30, 2011

(54) DRIVING EVALUATION SYSTEM AND SERVER

(75) Inventors: Ichiro Yoshida, Takahama (JP); Masayuki Taki, Anjo (JP)

(73) Assignee: DENSO CORPORATION, Kariya (JP)

( * ) Notice: Subject to any disclaimer, the term of this patent is extended or adjusted under 35 U.S.C. 154(b) by 1544 days.

(21) Appl. No.: 11/363,282

(22) Filed: Feb. 28, 2006

(65) Prior Publication Data

US 2006/0200277 A1    Sep. 7, 2006

(30) Foreign Application Priority Data

Mar. 2, 2005    (JP) ................................. 2005-057395

(51) Int. Cl.
| | |
|---|---|
| *G01C 21/00* | (2006.01) |
| *G01C 21/10* | (2006.01) |
| *G01C 21/14* | (2006.01) |
| *G01C 21/30* | (2006.01) |
| *G08G 1/123* | (2006.01) |
| *G06F 11/00* | (2006.01) |

(52) U.S. Cl. ... 701/205; 701/208; 701/211; 340/995.17; 340/995.22; 702/188

(58) Field of Classification Search .......... 701/1, 23–25, 701/28, 35–36, 70, 116–117, 200–202, 205, 701/208, 211, 300; 340/901, 988, 990, 995.1, 340/995.16, 995.17, 995.18, 995.22; 702/1, 702/127, 187, 188
See application file for complete search history.

(56) References Cited

U.S. PATENT DOCUMENTS

| | | | |
|---|---|---|---|
| 5,269,687 A | 12/1993 | Mott et al. | |
| 5,354,202 A | 10/1994 | Moncrief et al. | |
| 5,577,913 A | 11/1996 | Moncrief et al. | |
| 5,742,699 A * | 4/1998 | Adkins et al. | 382/107 |
| 6,200,139 B1 | 3/2001 | Clapper | |
| 2002/0064764 A1 | 5/2002 | Fishman et al. | |
| 2003/0105558 A1* | 6/2003 | Steele | 701/1 |
| 2003/0130822 A1* | 7/2003 | Steele | 702/188 |
| 2006/0287826 A1* | 12/2006 | Shimizu et al. | 701/216 |
| 2009/0278938 A1* | 11/2009 | Shulman | 348/169 |

FOREIGN PATENT DOCUMENTS

| | | |
|---|---|---|
| JP | A-07-141095 | 6/1995 |
| JP | A-10-97179 | 4/1998 |
| JP | A-10-274918 | 10/1998 |
| JP | A-11-308527 | 11/1999 |

(Continued)

OTHER PUBLICATIONS

Notice of Reasons for Rejection mailed on Apr. 6, 2010 issued from the Japanese Patent Office in the corresponding Japanese patent application No. 2005-057395 (and English translation).

*Primary Examiner* — Jack Keith
*Assistant Examiner* — Edward Pipala
(74) *Attorney, Agent, or Firm* — Posz Law Group, PLC

(57) ABSTRACT

Travel information of a target vehicle is stored in time sequence and, on the basis of the travel information and pre-stored travel information of a professional driver's vehicle, a travel position of the target vehicle and a travel position of the professional driver's vehicle are displayed in animation. In such a manner, the driver can visually recognize the travel positions of the displayed target vehicle and the reference vehicle and understand how much the target vehicle is deviated from the ideal travel position.

19 Claims, 13 Drawing Sheets

FOREIGN PATENT DOCUMENTS

| | | |
|---|---|---|
| JP | A-2000-153069 | 6/2000 |
| JP | A-2000-237453 | 9/2000 |
| JP | A-2001-180538 | 7/2001 |
| JP | A-2002-95865 | 4/2002 |
| JP | A-2002-211265 | 7/2002 |
| JP | A-2002-260146 | 9/2002 |
| JP | A-2003-76260 | 3/2003 |
| JP | A-2003-228276 | 8/2003 |
| JP | A-2003-340150 | 12/2003 |
| JP | A-2004-279077 | 10/2004 |

* cited by examiner

EX) CALCULATING DEMERIT POINT ON SPEED
IN STRAIGHT-AHEAD (AB) SECTION

FIG. 5

| PATTERN | ITEMS | DIRECTION | COE. | COMMENT |
|---|---|---|---|---|
| RIGHT TURN | SPEED | POSITIVE | 0.7 | NOT TO STEP TOO MUCH |
| | | NEGATIVE | 0.2 | ADJUST SPEED ADEQUATELY |
| | ACCELERATION | POSITIVE | 0.8 | NOT TO SPEED UP |
| | | NEGATIVE | 0.1 | ADJUST SPEED ADEQUATELY |
| | LOCUS DIF. | OUTWARD | 0.3 | NOT MAKE TURN TOO OUTSIDE |
| | | INWARD | 0.3 | WATCH TWO-WHEEL |
| | ORIENTATION CHANGE | POSITIVE | 0.5 | NOT MAKE SHARP TURN |
| | | NEGATIVE | 0.5 | NOT MAKE SHARP TURN |
| STRAIGHT | SPEED | POSITIVE | · · | · · |
| | | NEGATIVE | · · | · · |
| | ACCELERATION | · · | · · | |
| | LOCUS DIF. | · · | · · | |
| | ORIENTATION CHANGE | · · | | |
| LEFT TURN | · · | · · | | |
| | · · | | | |
| | · · | | | |

DRIVING EVALUATION SYSTEM AND SERVER

CROSS REFERENCE TO RELATED APPLICATIONS

This application is based on and incorporates herein by reference Japanese Patent Application No. 2005-57395 filed on Mar. 2, 2005.

FIELD OF THE INVENTION

The present invention relates to a driving supporting system for improving driving techniques.

BACKGROUND OF THE INVENTION

In recent years, demands for developing safety techniques in vehicles are changing from the viewpoint of assuring safety at the time of occurrence of an accident to the viewpoint of preventing occurrence of an accident. As one of methods for preventing occurrence of an accident, various driving evaluation apparatuses for improving driving techniques are proposed. For example, a driving evaluation apparatus disclosed in Patent Document 1 measures driving operations (operations on the steering wheel, pedal, gear, winker, and the like) of the driver, physical operations (sight line movement, confirming operation, and the like), physiologic data (cardiac rate, blood pressure, blink, electroencephalogram, electromyography, and the like) and calculates a danger recognition characteristic from the measurement results. The calculated danger recognition characteristic of the driver is compared with a preliminarily calculated danger recognition characteristic of a professional driver (such as an instructor in a driving school), and the comparison result is notified to the driver (refer to FIGS. 17, 18, and 19 of Patent Document 1).

The driving evaluation apparatus of Patent Document 1 just notifies the driver of the difference between the danger recognition characteristic of the professional driver and that of the driver so that the driver recognizes danger caused by the difference. However, this apparatus does not notify of specific driving operations and physical operations the driver has to learn at time points during driving and necessary correction amounts in the operations. Consequently, a driver using this apparatus has to find the driving operations and physical operations to be learned by himself or herself and correct his/her operations in a trial and error method on the basis of the difference between the danger recognition characteristic of the driver and that of the professional driver. It places a burden on the driver and there is also a problem that it takes time for the driver to learn proper driving operations and physical operations.

Patent Document 1: JP-2002-260146A

SUMMARY OF THE INVENTION

The present invention has been achieved in view of the problems. It is an object of the present invention to provide a technique capable of making a driver easily recognize driving operations and physical operations to be learned and also easily recognize correction amounts on the operations. As a result, this technique is capable of shortening time necessary for the driver to learn proper driving operations and physical operations.

To achieve the above object, a driving evaluation apparatus includes: an input information storing unit, a reference information storing unit, a display unit, and a control unit. The input information storing unit stores, as input information, entered travel information of a target vehicle in time sequence on the basis of an instruction. The reference information storing unit stores travel information of a reference vehicle in time sequence. The display unit is constructed by multiple pixels and displays information in accordance with states of the pixels. The control unit outputs a start instruction and an end instruction of entry of the travel information to the input information storing unit and, on the basis of the input information stored in the input information storing unit and the reference information stored in the reference information storing unit, displays travel positions of the target vehicle and the reference vehicle in time sequence on the display unit so that the user can compare the travel positions. The "travel information" denotes information indicative of operating states of a vehicle such as speed, acceleration, position, and the like. The "reference vehicle" denotes a vehicle which travels ideally and is, for example, a vehicle driven by a professional driver such as an instructor in a driving school. The "user" mainly refers to, although not limited, the driver of a target vehicle. The sentence "the user can compare" means that the user can intuitively determine the difference between the travel position of the target vehicle and the travel position of the reference vehicle, including the degree of difference, at the sight of travel loci displayed on the display unit. For example, a road map is displayed on the display unit, and the locus of the travel position of the target vehicle and that of the reference vehicle are simultaneously displayed.

The conventional technique is directed to make the driver recognize the degree of danger. In contrast, the driving evaluation apparatus of the present invention displays the travel positions of the target vehicle and the reference vehicle on the display unit; therefore, the user can understand how much the target vehicle is deviated from the ideal travel position at a glance. The driver of the target vehicle can also easily recognize the correction amount of the driving operation, thereby shortening the time necessary for the driver to learn proper driving operations and the like.

Although only information indicative of the operating states of a vehicle called travel information may be stored in the input information storing unit, it is more preferable to store the driving operation information of the driver. Preferably, the input information storing unit further stores driving operation information of the driver of the target vehicle entered as the input information in time sequence; the reference information storing unit further stores driving operation information of the driver of the reference vehicle as the reference information in time sequence. At the time of displaying the travel positions of the vehicles on the display unit, the control unit also displays the driving operations of the drivers corresponding to the travel positions of the vehicles on the display unit on the basis of the driving operation information stored in the input information storing unit and the driving operation information stored in the reference information storing unit.

With such arrangement, the user can understand not only the travel positions of the target vehicle and the reference vehicle but also driving operation information and can know a countermeasure for ideal driving more intuitively. For example, when the interval between the target vehicle and the reference vehicle starts widening in the travel direction, the driver can know immediately that the cause is the brake operation or the throttle operation.

There are various methods of displaying travel positions of the target vehicle and the reference vehicle in time sequence on the display unit so that the user can compare the travel positions. An example of the methods is a display method using vehicle models. Specifically, the control unit performs the displaying operation by simultaneously displaying superimposable vehicle models corresponding to the target vehicle and the reference vehicle in positions in the display unit according to the travel positions. The "vehicle model" denotes here a model schematically expressing the appearance of a vehicle and is, desirably, a model obtained by accurately reducing the shape and size of an actual vehicle.

With the vehicle models, the user can understand the position relation between the target vehicle and the reference vehicle at a glance. Since the vehicle models are superimposable, also in the case where the target vehicle and the reference vehicle are close to each other and the vehicle models are displayed so as to overlap each other, each of the vehicle models can be recognized.

In the case of using the vehicle models, preferably, the driving evaluation apparatus further includes a superimposing-degree information accepting unit for accepting information on the superimposing degree of each of the vehicle models from the user. The control unit displays each of the vehicle models on the display unit at a superimposing degree based on the information on the superimposing degree received by the superimposing-degree information accepting unit.

With the configuration, the model of the target vehicle can be made conspicuous by setting, for example, the superimposing degree of the model of the target vehicle to be lower than that of the model of the reference vehicle in accordance with the intention of the user. This allows the travel state of the target vehicle to be more easily recognized. In contrast, the model of the reference vehicle can be made conspicuous by setting, for example, the superimposing degree of the model of the target vehicle to be higher than that of the model of the reference vehicle. This allows the travel state of the reference vehicle to be more easily recognized.

Preferably, the display color of the vehicle model is determined on the basis of the following methods (a) to (c) and displayed on the display unit.

(a) Steering Operation Start Timing

The control unit may change a display color of the vehicle model of the target vehicle in accordance with a steering operation start timing of the driver of the target vehicle with respect to a steering operation start timing of the driver of the reference vehicle. More specifically, for example, when the steering start timing of the driver of the target vehicle is behind that of the driver of the reference vehicle, the model of the target vehicle is displayed in blue. When the steering start timing of the driver of the target vehicle is earlier than that of the driver of the reference vehicle, the model of the target vehicle is displayed in red.

In such a manner, only by checking the color of the model of the target vehicle, the user can recognize whether the steering start timing of the driver of the target vehicle is behind or earlier with respect to the steering start timing of the driver of the reference vehicle.

(b) Acceleration/Deceleration Operation Start Timing

The control unit may change a display color of the vehicle model of the target vehicle in accordance with an acceleration/deceleration start timing of the driver of the target vehicle with respect to an acceleration/deceleration start timing of the driver of the reference vehicle. Specifically, for example, when the acceleration/deceleration start timing of the driver of the target vehicle is behind that of the driver of the reference vehicle, the model of the target vehicle is displayed in red. When the acceleration/deceleration start timing of the driver of the target vehicle is earlier than that of the driver of the reference vehicle, the model of the target vehicle is displayed in blue.

In such a manner, only by checking the color of the model of the target vehicle, the user can recognize whether the acceleration/deceleration start timing of the driver of the target vehicle is behind or earlier with respect to the acceleration/deceleration start timing of the driver of the reference vehicle.

(c) The Side (Right or Left Side) of Travel Position of Target Vehicle in Travel Direction with Respect to Reference Travel Locus Preferably, the control unit changes a display color of the vehicle model of the target vehicle in accordance with the travel position of the target vehicle which is the right or left side in the travel direction, of a travel locus of the reference vehicle. More specifically, for example, in the case where the target vehicle is positioned on the right side in the travel direction of the reference vehicle, the model of the target vehicle is displayed in red. In the case where the target vehicle is positioned on the left side in the travel direction of the reference vehicle, the model of the target vehicle is displayed in blue. When a right turn is used as an example, the case where the target vehicle is positioned on the left side in the travel direction of the reference vehicle denotes that the timing of operating the steering wheel of the driver of the target vehicle is behind that of the operator of the reference vehicle, the steering angle is small, or the brake operation is slow.

With the arrangement, only by checking the color of the model of the target vehicle, the user can recognize the side (right or left) in the travel direction of the travel position of the target vehicle with respect to the travel position of the reference vehicle.

The vehicle model or the like displayed on the display unit may be drawn in a two-dimensional space. More preferably, the vehicle model is drawn in a virtual three-dimensional space, and the viewpoint position can be freely changed by the user. Specifically, the driving evaluation apparatus further includes a viewpoint position information accepting unit for accepting viewpoint position information of a viewpoint position in virtual three-dimensional display from the user. The control unit displays the vehicle model to be displayed on the display unit by a virtual three-dimensional method using, as a viewpoint, a viewpoint position corresponding to the viewpoint position information accepted by the viewpoint position information accepting unit.

With the configuration, a vehicle model or the like displayed on the display unit becomes closer to an actual state, so that the user can understand the travel states of the target vehicle and the reference vehicle more easily.

Preferably, the viewpoint position in the case where the vehicle model or the like is drawn by the virtual three-dimensional method is a viewpoint position of the driver of a vehicle following the target vehicle. When the viewpoint position of the driver of a following vehicle is used, the relation between the target vehicle and scenery is close to actual driving states and the user can visually recognize the whole target vehicle. Thus, the travel state of the target vehicle can be recognized objectively.

A driving evaluation apparatus that solves the problem includes an input image storing unit, a reference image storing unit, a display unit, and a control unit. The input image storing unit stores, as input images, entered front images of a target vehicle in time sequence on the basis of an instruction. The reference image storing unit stores, as reference images, front images of a reference vehicle in time sequence. The display unit is constructed by multiple pixels and displays information in accordance with states of the pixels. The control unit outputs a start instruction and an end instruction of entry of the front image to the input image storing unit. The control unit then displays the input images stored in the input image storing unit and the reference images stored in the reference image storing unit in time sequence onto the display unit so that the user can compare the images. The "front image" denotes an image in front of (ahead of) a vehicle, captured by a camera mounted on a dash board, the back of a room mirror, at the front end of the vehicle, or the like. The "reference vehicle" denotes a vehicle that travels ideally and is a vehicle driven by a professional driver such as an instructor in a driving school or the like. The "user" mainly refers to, although not limited, the driver of a target vehicle. The sentence "the user can compare" means that the user can intuitively determine the difference between the travel state of the target vehicle and the travel state of the reference vehicle, including the degree of difference, at the sight of the front displayed on the display unit. Concretely, for example, an image in front of the reference vehicle is displayed in the upper half of the display unit, and an image in front of the target vehicle is displayed in the lower half of the display unit.

The conventional technique is directed to make the driver recognize the degree of danger. In contrast, the driving evaluation apparatus of the present invention displays the images in front of the target vehicle and the reference vehicle on the display unit. This allows the user to understand how much the target vehicle is deviated from the ideal travel position at a glance. The driver of the target vehicle can also easily recognize the correction amount of the driving operation, thereby shortening the time necessary for the driver to learn proper driving operations and the like.

Although only the image in front may be stored in the input image storing unit, it is more preferable to store a driving operation image of the driver. Preferably, the input image storing unit further stores driving operation images of the driver of the target vehicle as input images in time sequence, and the reference image storing unit further stores driving operation images of the driver of the reference vehicle as the reference images in time sequence. At the time of displaying images in front of the vehicles on the display unit, the control unit also displays a driving operation image stored in the input image storing unit and a driving operation image stored in the reference image storing unit on the display unit so as to be associated with the images in front of the vehicles. The "driving operation information" is information such as steering angle, throttle position, brake pedal stroke amount, shift position, and operation of a turn signal lamp.

With such arrangement, the user can understand not only the front images of the target vehicle and the reference vehicle but also driving operation states and can know a countermeasure for ideal driving more intuitively. For example, when the interval between the target vehicle and the reference vehicle starts widening in the travel direction, the driver can know immediately that the cause is the brake operation or the throttle operation.

In the case of displaying the front image of the vehicle on the display unit, the image looks slightly different according to an image capturing position. For example, in the case where the front image capturing position of the target vehicle is 1.5 m from the road surface and that of the reference vehicle is 1 m from the road surface, the positions of the horizon look different from each other. Consequently, there may be cases that the user cannot easily recognize the difference between the travel state of the target vehicle and the travel state of the reference vehicle. To avoid such cases, preferably, the control unit corrects the front image of the reference vehicle so that the horizon position of the front image of the target vehicle and that of the front image of the reference vehicle coincide with each other, and displays the resultant images on the display unit. The "correction" denotes here deformation of part or all of the front image or enlargement of only part of the front image.

With the arrangement, even in the case where the level of the position of capturing the front image in the target vehicle and that in the reference vehicle are different from each other, the front images can be made similar to each other.

Preferably, the user can freely control the reproduction states such as a vehicle model and a front image displayed on the display unit. More specifically, the driving evaluation apparatus further includes a rewrite information accepting unit for accepting information on speed of rewriting frames in the display unit and a rewriting direction on the time base from the user. The control unit controls a display frame to be displayed on the display unit on the basis of the information accepted by the rewrite information accepting unit.

With the arrangement, for example, when the user wishes to reproduce "the present scene" once again in a slow mode, it can be realized. Thus, the user can learn the ideal driving operations more easily.

The driving evaluation apparatus may further include a position information obtaining unit for obtaining position information for specifying a present position of the target vehicle. On the basis of the position information obtained by the position information obtaining unit, the control unit outputs the start instruction when the target vehicle reaches a start point of a predetermined section and outputs the end instruction when the target vehicle reaches an end point of the predetermined section.

With the configuration, when the target vehicle reaches a start point of a predetermined section, the start instruction is automatically output, and storage of travel information and the front image of the vehicle starts. When the target vehicle reaches an end point of the predetermined section, the end instruction is automatically output and storage of the travel information and the front image of the vehicle is stopped. Therefore, since the driver of the target vehicle is not requested to perform operations for the start instruction and the end instruction, the usability improves.

In this case, preferably, the driving evaluation apparatus further includes: a section information storing unit for storing multiple pieces of information of the predetermined section used when the control unit determines the start instruction and the end instruction; and a specific information accepting unit for accepting specific information for specifying information in the plurality of pieces of information of the predetermined section stored in the section information storing unit from the driver of the target vehicle. The control unit uses a section corresponding to the specific information accepted by the specific information accepting unit as the predetermined section used at the time of determining the start instruction and the end instruction.

With the configuration, a section of recording travel information of the vehicle and the front image can be selected according to the intention of the driver of the target vehicle.

To promote such a driving evaluation apparatus to be positively used by the drivers, it is preferable to provide a mechanism giving some motivations. For example, competency of the driver of the target vehicle is evaluated on the basis of input information stored in the input information storing unit and the reference information stored in the reference information storing unit, and the evaluation result is sent together with the information specifying the target vehicle or information specifying the driver of the target vehicle to a server via a communication unit.

With the configuration, some incentives such as points can be provided to the driver on the basis of the evaluation result in the server.

As an example of the incentives, the driver is notified of the ranking of the driver based on the evaluation result. Specifically the control unit receives ranking information based on the evaluation result from the server via the communication unit, and displays the information on the display unit.

With the configuration, the driver makes efforts to improve his/her driving techniques in order to increase the ranking.

For example, a server corresponding to such a driving evaluation apparatus includes: a server-side communication unit for performing communication with a driving evaluation apparatus; a competency evaluation result holding unit for holding a list of competency evaluation results of drivers; and a server-side control unit for adding a competency evaluation result of a driver, which is received via the server-side communication unit to the competency evaluation result holding unit, determining a rank to which the received evaluation result corresponds, and transmitting the determination result as ranking information to the driving evaluation apparatus via the server-side communication unit.

With such a server, ranking information can be provided to the driving evaluation apparatus, and the driving evaluation apparatus can produce the above-described effects.

BRIEF DESCRIPTION OF THE DRAWINGS

The above and other objects, features, and advantages of the present invention will become more apparent from the following detailed description made with reference to the accompanying drawings. In the drawings:

FIG. 5 is a diagram illustrating the configuration of a coefficient table;

DETAILED DESCRIPTION OF THE PREFERRED EMBODIMENTS

Embodiments of the invention will be described hereinbelow with reference to the drawings. The invention is not limited to the following embodiments but can be embodied variously without departing from the technical scope of the invention.

(Description of Configuration)

Figure 1:
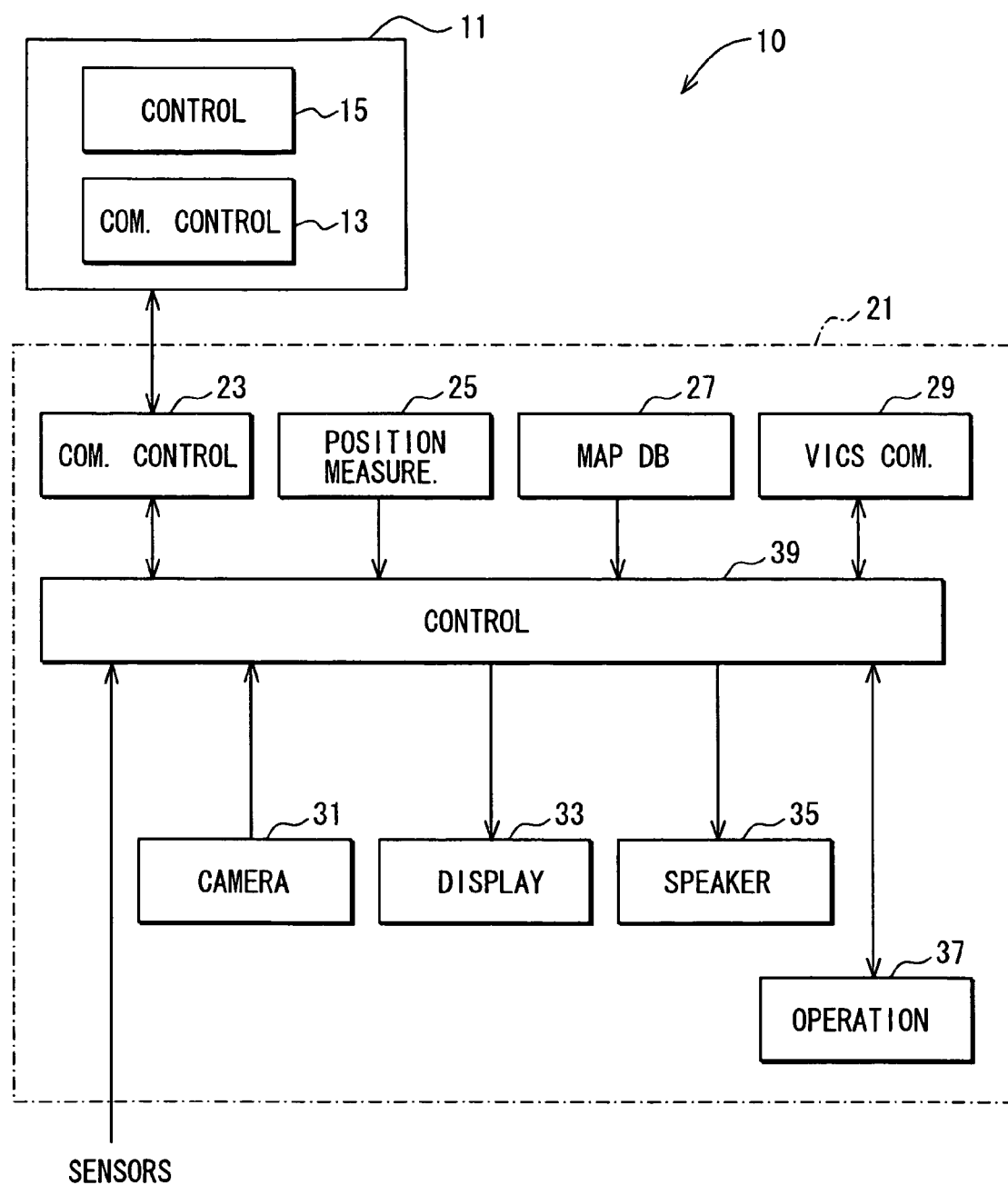
FIG. 1 is a block diagram showing a schematic configuration of a driving evaluation system 10.

FIG. 1 is a block diagram showing a schematic configuration of a driving evaluation system 10. As shown in FIG. 1, the driving evaluation system 10 is constructed by a server 11 provided in a control center or the like and a driving evaluation apparatus 21 mounted on a vehicle. Although only one server 11 and only one driving evaluation apparatus 21 are shown in FIG. 1, multiple driving evaluation apparatuses 21 may be provided.

The server 11 has a communication control unit 13 and a control unit 15. The communication control unit 13 is connected to a packet communication network and has the function of performing communications with the driving evaluation apparatus 21. The control unit 15 stores professional driver's data, driving evaluation point information, ranking data, and the like and controls the server 11 in a centralized manner. The "professional driver's data" denotes travel information of a vehicle driven by a professional driver such as an instructor in a driving school, driving operation information of the professional driver, and images captured in viewpoint positions of the professional driver. The travel information includes information indicative of operating states of the vehicle such as speed, acceleration, and position. The driving operation information includes steering angle, throttle position, brake pedal stroke amount, shift position, and operation of a turn signal lamp. The "driving evaluation point information" denotes information of a point in which the professional driver's data is registered (more accurately, information of a "section" between a start point and an end point), that is, information of points in which driving evaluation can be made. The "ranking data" is ranking data of driving evaluation results at driving evaluation points.

The driving evaluation apparatus 21 has a communication control unit 23 having the function of performing communications with the server 11, a position measuring unit 25 for measuring the present position of the vehicle, a map DB 27 for storing map data, a VICS (Vehicle Information and Communication System) communication unit 29 for receiving traffic information from a not-shown VICS center, a camera unit 31 for capturing an image in front of the vehicle, a display 33 for displaying information, a speaker 35 for outputting sound, an operation unit 37 for accepting an operation instruction or the like from the driver, and a control unit 39 for controlling the units in a centralized manner.

The communication control unit 23 performs communications with the server 11 via a not-shown antenna and a wireless packet communication network.

The position measuring unit 25 receives electric waves from a GPS (Global Positioning System) satellite, measures the present position of the vehicle, and outputs the measured position as present position data.

The map DB 27 stores map data (node data, link data, cost data, background data, road data, name data, mark data, junction data, facility data, and the like), guidance voice data, sound recognition data, and the like.

The VICS communication unit 29 obtains accident information, traffic jam information, and the like from the VICS center via an optical beacon, electric wave beacon, or the like mounted on a roadside.

The camera unit 31 is a camera mounted at the front end of an engine bonnet of the vehicle, a dash board, the back of a room mirror, or the like, which captures an image in front of the vehicle and outputs video information to the control unit 39.

The display 33 takes the form of a liquid crystal display, an organic EL display, or the like and outputs the video signal received from the control unit 39 as a video image. Alternately, the video image may be projected to the front window so that the driver can see the video image together with an actual image.

The speaker 35 outputs the sound signal received from the control unit 39 as sound.

The operation unit 37 is constructed by a touch panel integrated with the screen of the display 33, mechanical key switches provided around the display 33, and the like. The operation unit 37 may take the form of a remote controller for performing communication by infrared light or the like.

The control unit 39 is constructed mainly by a known microcomputer including a CPU, a ROM, a RAM, an SRAM, an I/O, bus lines connecting the components, and the like, and executes various processes on the basis of programs stored in the ROM and the RAM. At the time of executing processes, the control unit 39 receives information from not only the communication control unit 23, position measuring unit 25, map DB 27, VICS communication unit 29, and camera unit 31 but also sensors mounted in parts of the vehicle (a steering angle sensor, a throttle sensor, a brake sensor, a speed sensor, an acceleration sensor, a winker sensor, a shift position sensor, a vehicle tilt sensor, and the like). The control unit 39 outputs the information to the communication control unit 23, VICS communication unit 29, display 33, and speaker 35.

Next, among the processes executed by the control unit 39, characteristic processes related to the present invention will be described below.

(Description of Operations)

1. First Embodiment

Figure 2:
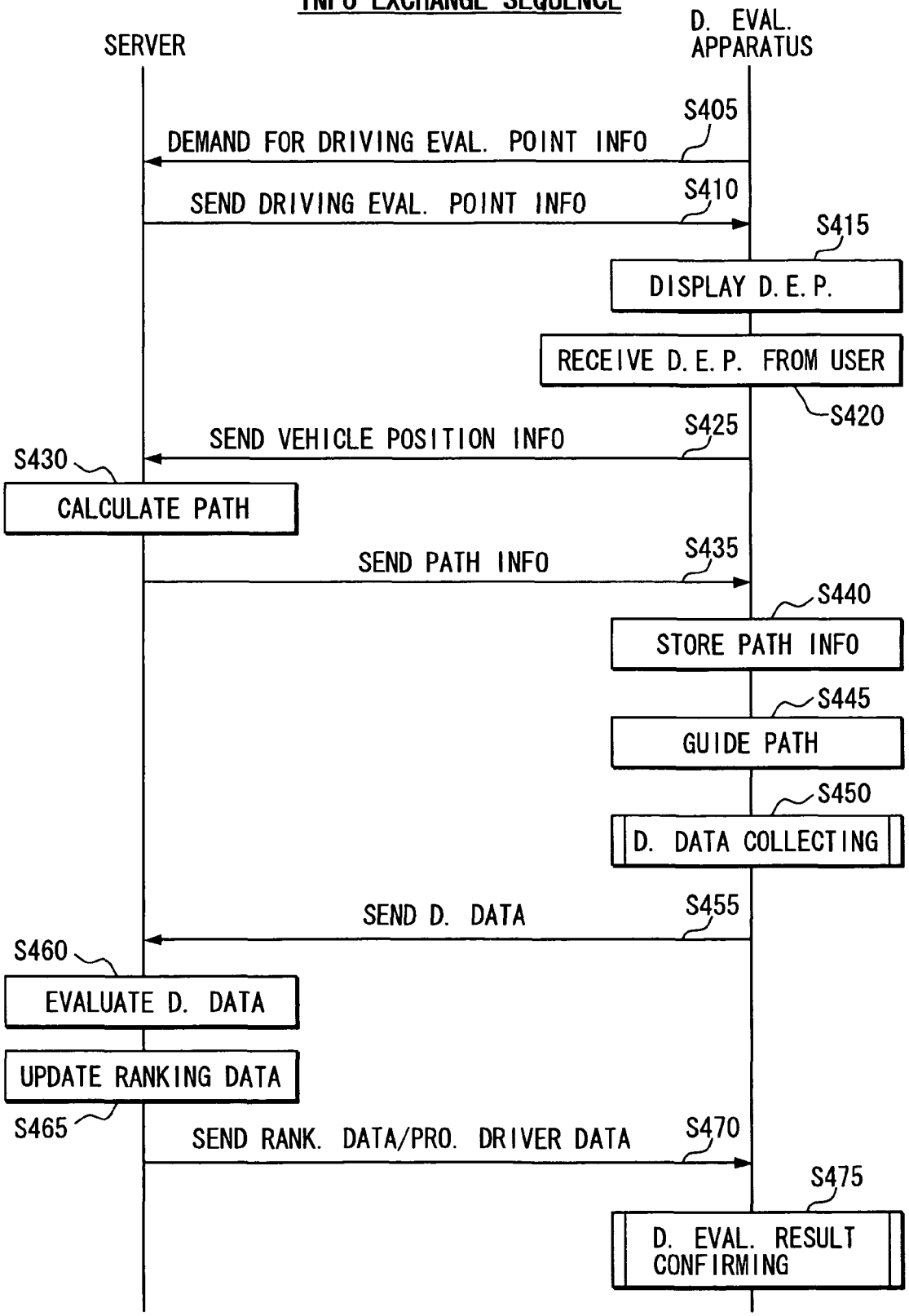
FIG. 2 is a sequence diagram of information exchange between a driving evaluation apparatus 21 and a server 11.

A first embodiment will be described. FIG. 2 is a sequence diagram of information exchange between the driving evaluation apparatus 21 and the server 11. First, when the operation unit 37 receives an instruction to make a driving evaluation from the driver of a vehicle on which the driving evaluation apparatus 21 is mounted (hereinbelow, simply called "driver"), the driving evaluation apparatus 21 demands the server 11 for driving evaluation point information via the communication control unit 23 (S405).

When the demand is received from the driving evaluation apparatus 21, the server 11 sends the driving evaluation point information stored in the control unit 15 to the driving evaluation apparatus 21 (S410).

On receipt of the driving evaluation point information from the server 11, the driving evaluation apparatus 21 displays the driving evaluation point on the display 33 (S415). In a display example shown in FIG. 3A, multiple marks 610 indicative of the driving evaluation points are displayed and can be selected by using the touch panel. A mark 610 designated by the driver with the touch panel is displayed so as to be larger than the other marks 610. When a selection determination button 620 is touched by the driver, the driving evaluation point corresponding to the mark 610 selected at that time is recognized as a driving evaluation point desired by the driver.

Figure 3A:
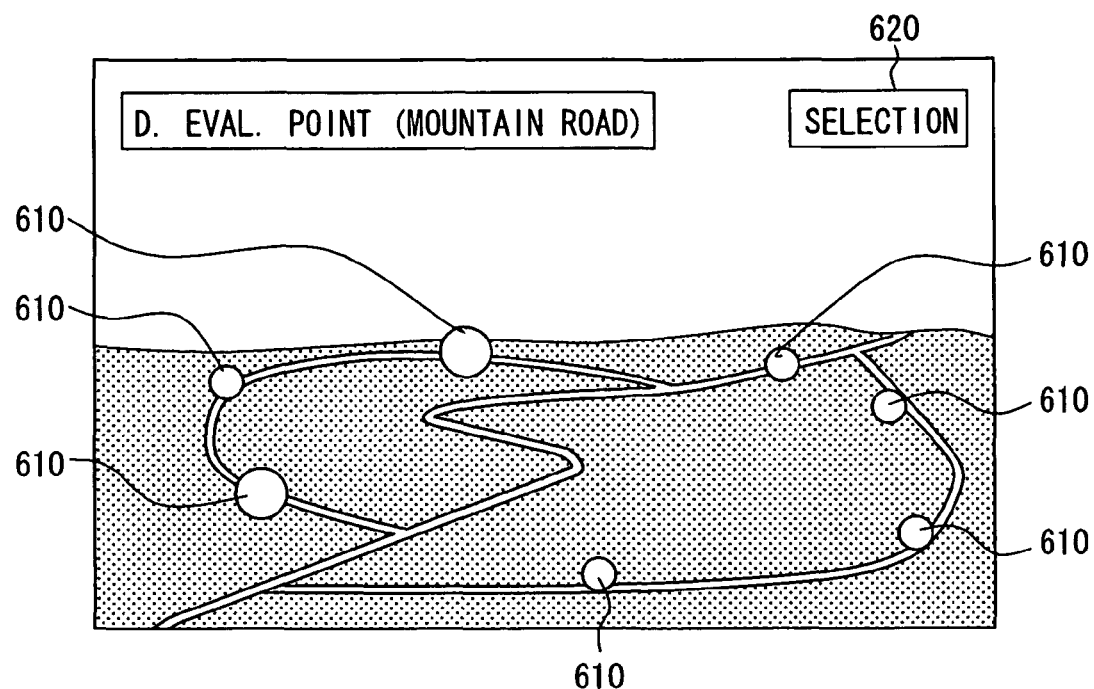
FIGS. 3A and 3B are examples of screens for setting a driving evaluation point.
Figure 3B:
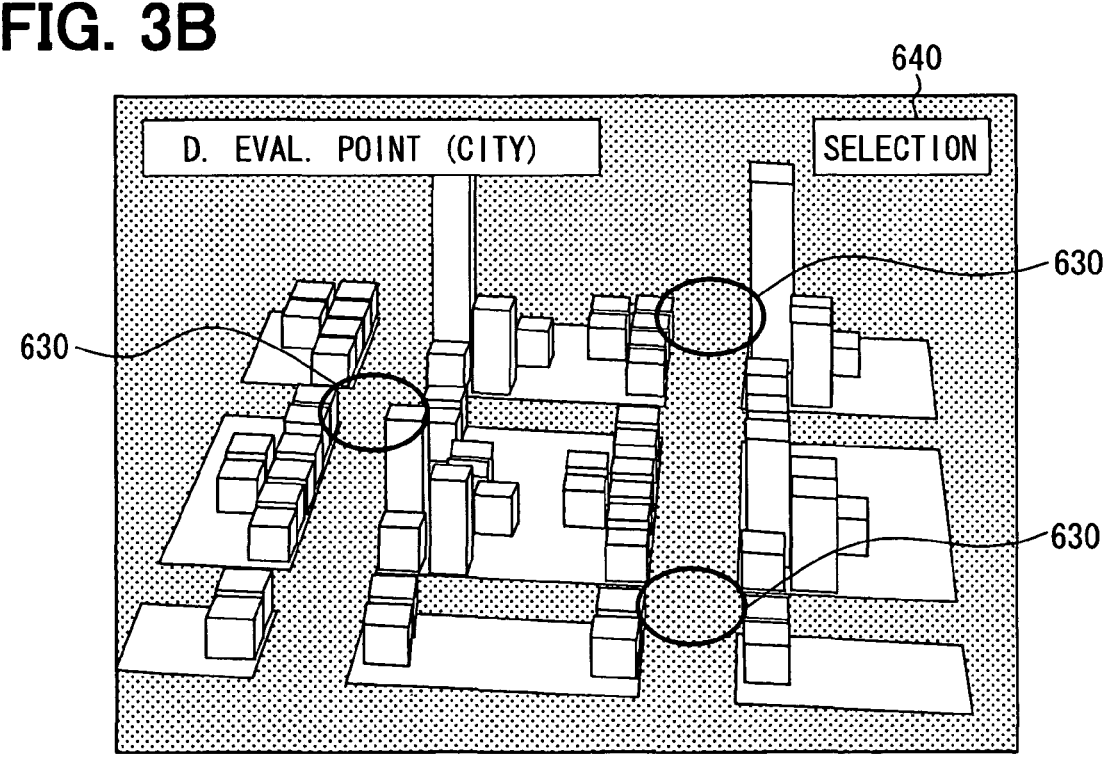

On the other hand, FIG. 3B shows a display example of the case where the scale is larger than that in FIG. 3A. As shown in FIG. 3B, multiple marks 630 each indicative of a junction as a driving evaluation point are displayed and can be selected with the touch panel. When a selection determination button 640 is touched by the driver, the driving evaluation point corresponding to the mark 630 selected at that time is recognized as a driving evaluation point desired by the driver.

Referring again to FIG. 2, the driving evaluation apparatus 21 receives a driving evaluation point from the driver via the operation unit 37 (S420), and transmits the received driving evaluation point information together with vehicle position information to the server 11 (S425). The "vehicle position information" to be transmitted is position information measured by the position measuring unit 25.

When the vehicle position information and the driving evaluation point information is received from the driving evaluation apparatus 21, on the basis of the information, the server 11 calculates the optimum path to the driving evaluation point (S430). For calculation of the path, a widely known Dijkstra method is used. A path is calculated also in consideration of traffic information (such as accident information, traffic jam information, itinerary time in a section, and the like). After a path is calculated, the path information is sent to the driving evaluation apparatus 21 (S435).

The driving evaluation apparatus 21 receives the path information from the server 11, temporarily stores it in the RAM in the control unit 39 (S440) and, on the basis of the path information, executes path guiding (S445). The path guiding method is a widely known method using the present position data which is output from the position measuring unit 25 and the map data stored in the map DB 27. Concretely, for example, a map in which a path is clearly shown and the present position is also indicated is displayed on the display 33, or voice of guiding the path is output from the speaker 35. When the vehicle reaches the point in which the driving evaluation starts during execution of the path guidance, driving data collecting process is executed (S450). The details of the driving data collecting process will be described later. After completion of the driving data collecting process, the driving evaluation apparatus 21 transmits the collected driving data to the server 11 (S455).

The server 11 which has received the driving data compares the received driving data with the stored professional drivers data and makes an evaluation (S460). An evaluating method will be described with reference to the explanatory diagrams of FIGS. 4A and 4B and the coefficient table of FIG. 5.

Figure 4A:
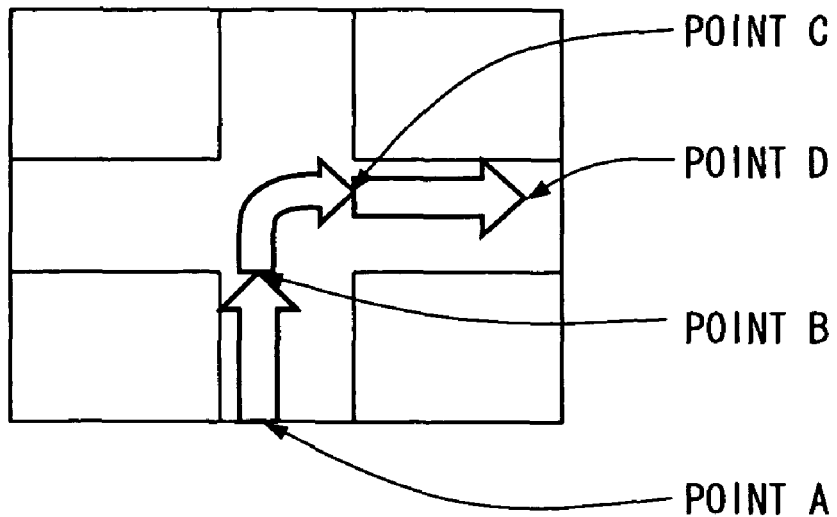
FIGS. 4A and 4B are diagrams for explaining an evaluating method.

For example, in the case where the driving evaluation point is a junction, the junction is divided into three sections (a section from point A to point B, a section from point B to point C, and a section from point C to point D) (refer to FIG. 4A). In each section, the professional driver data is compared with each of elements of the received driving data and the demerit points are calculated.

Figure 4B:
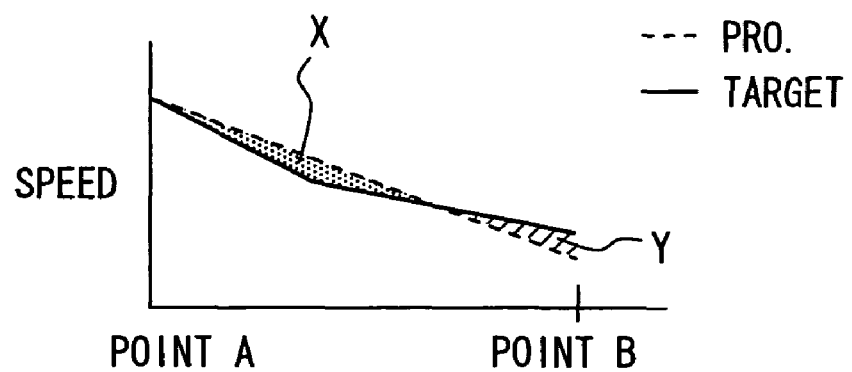

For example, at the time of calculating the demerit points on vehicle speed in the section AB, areas X and Y (that is, integral values of the vehicle speed difference) of the difference portions are calculated in the case where a vehicle driven by a professional driver (hereinbelow, called "professional driver's vehicle") is faster than a vehicle to be evaluated on speed (hereinbelow, called "target vehicle") and in the case where the professional driver's vehicle is slower than the target vehicle (refer to FIG. 4B). In FIG. 4B, the horizontal axis is set as displacement and the vertical axis is set as vehicle speed. Each of the areas is multiplied with a predetermined coefficient (refer to FIG. 5), thereby calculating the demerit point for each of the areas.

Demerit point (in straight-ahead driving/vehicle speed/negative direction) in the section $AB=X\times$ (coefficient in straight-ahead driving/vehicle speed/negative direction)

Demerit point (in straight-ahead driving/vehicle speed/positive direction) in the section $AB=Y\times$ (coefficient in straight-ahead driving/vehicle speed/positive direction)

By adding the demerit points calculated in such a manner, an evaluation value is calculated. FIG. 5 shows a coefficient table constructed by "travel pattern" indicative of right turn, left turn, straight-ahead driving, and the like; "data items" such as vehicle speed, acceleration, locus, and the like; "direction of deviation" from the travel locus of a professional driver's vehicle; "coefficient"; and "comment" used at the time of notifying of an evaluation result.

Referring again to FIG. 2, next, the server 11 finds the position in the ranking data, of the driving evaluation point on the basis of the evaluation result and updates the ranking data (S465). The server 11 sends the ranking data and the professional driver's data back to the driving evaluation apparatus 21 (S470).

The driving evaluation apparatus 21 which has received the ranking data and the professional driver's data stores the data into the RAM in the control unit 39 and executes the driving evaluation result confirming process (S475). The driving evaluation result confirming process starts when the operation unit 37 receives an instruction to confirm the driving evaluation result from the driver. The details of the driving evaluation result confirming process will be described later.

(a) Driving Data Collecting Process

Figure 6:
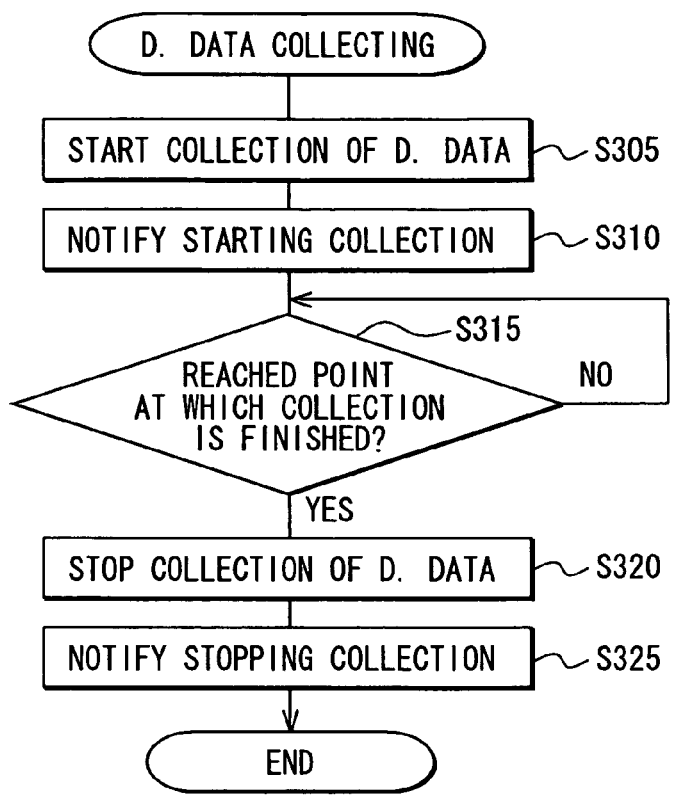
FIG. 6 is a flowchart showing a driving data collecting process.

The details of the driving data collecting process executed in the above-described step S450 (refer to FIG. 2) will be described with reference to the flowchart of FIG. 6. The driving data collecting process is a process executed in the control unit 39 on the basis of a program stored in the ROM in the control unit 39 in the driving evaluation apparatus 21.

When the control unit 39 starts executing the driving data collecting process, collection of the driving data starts (S305). The "driving data" denotes here travel information (data such as speed, acceleration, and position) of a vehicle on which the driving evaluation apparatus 21 is mounted, driving operation information (steering angle, throttle position, brake pedal stroke amount, shift position, and operation of a turn signal lamp) of the driver of the vehicle, and images captured by the camera unit 31.

Subsequently, the control unit 39 notifies the driver of the start of collection of driving data (S310). Concretely, the notification is performed by displaying characters indicative of start of collection of driving data on the display 33 or outputting sound indicative of start of collection of driving data to the speaker 35.

The control unit 39 determines whether or not the vehicle has reached the point at which collection of driving data is finished (S315). The determination is made by using the present position data output from the position measuring unit 25. When it is determined that the vehicle has not reached the point at which collection of driving data is finished (NO in S315), the control unit 39 remains in the step and continuously collects the driving data. On the other hand, when it is determined that the vehicle has reached the point at which collection of the driving data is finished (YES in S315), the collection of the driving data is stopped (S320). The stop of collection of the driving data is notified to the driver in a manner similar to the case of notifying the driver of the start (S325), and the process (driving data collecting process) is finished.

(b) Driving Evaluation Result Confirming Process

Figure 7:
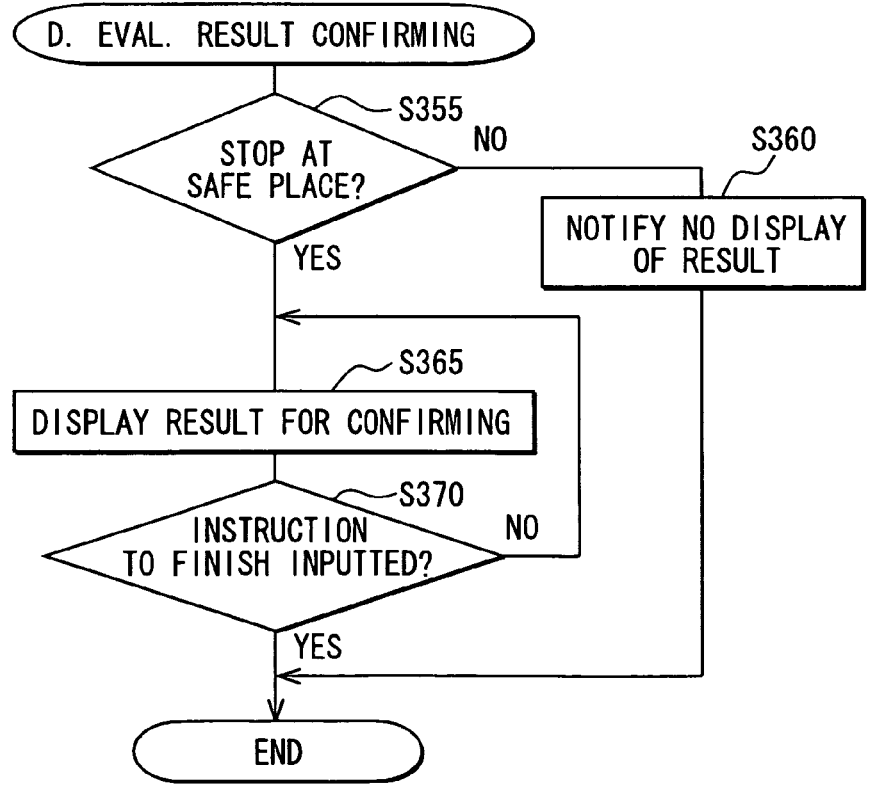
FIG. 7 is a flowchart showing a driving evaluation result confirming process.

The details of the driving evaluation result confirming process executed in the above-described step S475 (refer to FIG. 2) will be described with reference to the flowchart of FIG. 7. The driving evaluation result confirming process is a process executed by the control unit 39 on the basis of the program stored in the ROM in the control unit 39 in the driving evaluation apparatus 21.

When the control unit 39 starts executing the driving evaluation result confirming process, first, whether the vehicle is being stopped in a safe place or not is determined (S355). Concretely, by using the present position data output from the position measuring unit 25 and the map data stored in the map DB 27, whether or not the vehicle is being stopped in, for example, a service area, a parking, or the like is determined. In the case where it is determined that the vehicle is not being stopped in a safe place (NO in S355), the control unit 39 notifies the driver of a situation that the driving evaluation result cannot be displayed because the vehicle is not being stopped in a safe place (S360) and finishes the process (driving evaluation result confirming process). The notification is performed by using the display 33 or the speaker 35.

On the other hand, in the case where it is determined that the vehicle is being stopped in a safe place (YES in S355), a driving evaluation result confirmation screen is displayed on the display 33 (S365). The display example will be described later. Subsequently, whether the operation unit 37 has received an instruction of finishing the driving evaluation result confirmation screen from the driver or not is determined (S370). In the case where the operation unit 37 has not received such an instruction (NO in S370), the driving evaluation result confirmation screen is continuously displayed (S365). When the operation unit 37 has received the instruction of finishing the driving evaluation result confirmation screen (YES in S370), the process (driving evaluation result confirming process) is finished.

2. Second Embodiment

Figure 8:
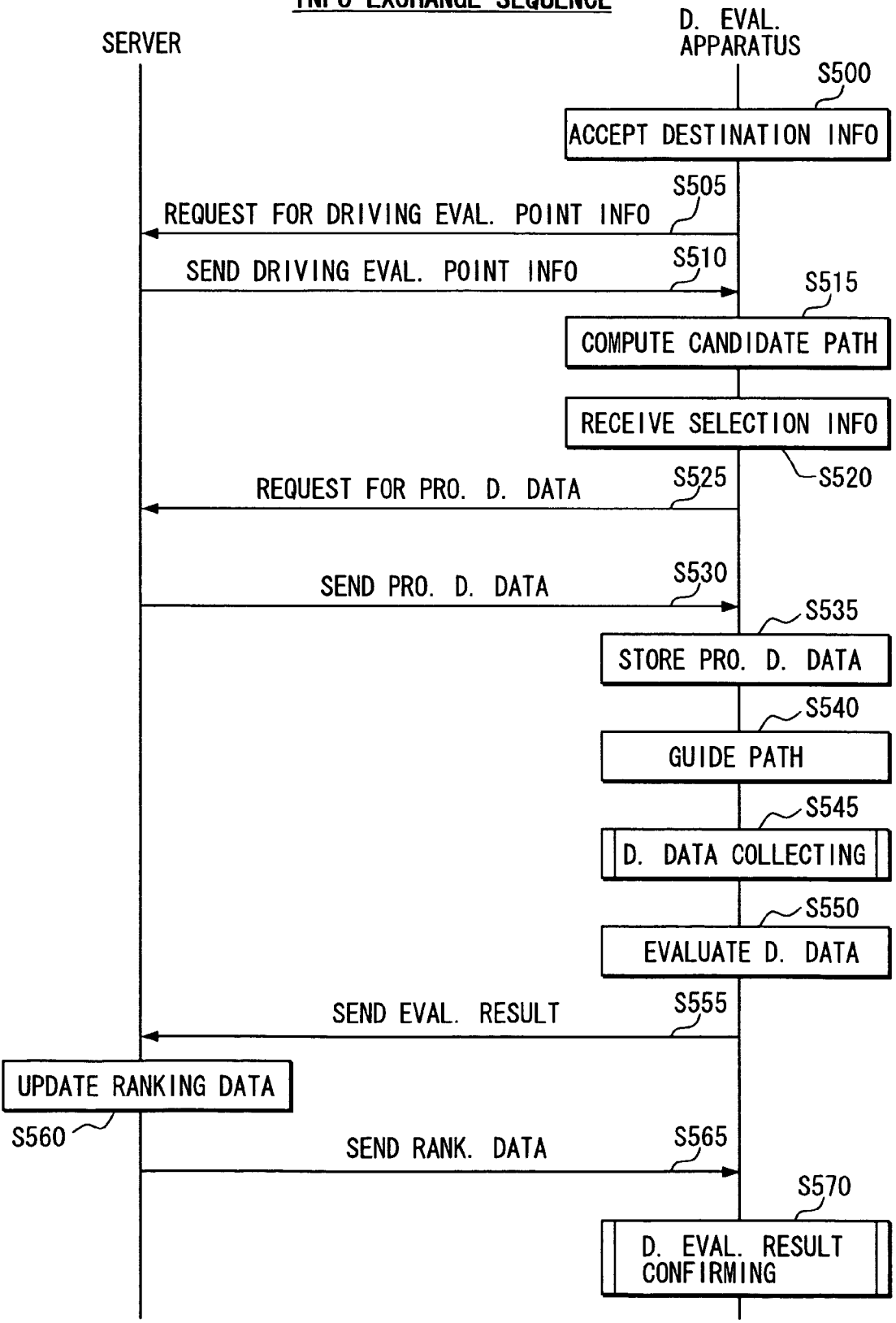
FIG. 8 is a sequence diagram of another information exchange between the driving evaluation apparatus 21 and the server 11.

A second embodiment will now be described. FIG. 8 is a sequence diagram of information exchange between the driving evaluation apparatus 21 and the server 11 in the second embodiment. First, when the operation unit 37 accepts information of a destination from the driver (S500), the driving evaluation apparatus 21 requests the server 11 for the driving evaluation point information via the communication control unit 23 (S505).

The server 11 receives the request from the driving evaluation apparatus 21 and sends the stored driving evaluation point information to the driving evaluation apparatus 21 (S510).

The driving evaluation apparatus 21 receives the driving evaluating point information from the server 11 and calculates some candidate paths including a path extending through the driving evaluation point (S515). The calculation of paths is executed by using the widely known Dijkstra method or the like in consideration of traffic information (such as traffic accident information, traffic jam information, section itinerary time, and the like) entered from the VICS communication unit 29.

Subsequently, the candidate paths are displayed on the display 33 so as to be presented to the driver, and information of selection of any of the candidate paths as a guide path is received from the driver via the operation unit 37 (S520).

In the case where the driving evaluation point is included in the guide path, the driving evaluation apparatus 21 requests the server 11 for professional driver's data of the corresponding driving evaluation point (S525).

When the request for professional driver's data is received from the driving evaluation apparatus 21, the server 11 sends the corresponding professional driver's data to the driving evaluation apparatus 21 (S530).

When the professional driver's data is received from the server 11, the driving evaluation apparatus 21 temporarily stores it in the RAM in the control unit 39 (S535) and executes the path guidance based on the guide path selected at S520 (S540). This path guiding method is a widely known method to use the present position data output from the position measuring unit 25 and the map data stored in the map DB 27. Concretely, for example, a map is displayed on the display 33 to clearly show a path and the present position on the map; voice of guiding the path is output to the speaker 35. When the vehicle reaches the point from which the driving evaluation starts during execution of the path guidance, driving data collecting process is executed (S545). The driving data collecting process is the same one as that in the first embodiment.

After completion of the driving data collecting process, the driving evaluation apparatus 21 compares the driving data with the stored professional driver's data, and makes an evaluation (S550). The evaluating method is similar to that of the first embodiment. After completion of the evaluation, the driving evaluation apparatus 21 sends the evaluation result to the server 11 (S555).

The server 11 which has received the evaluation result obtains the position of the received evaluation result in the ranking data of the corresponding driving evaluation point and updates the ranking data (S560). The server 11 sends the ranking data to the driving evaluation apparatus 21 (S565).

The driving evaluation apparatus 21 which has received the ranking data stores the data into the RAM in the control unit 39 and executes the driving evaluation result confirming process (S570). The driving evaluation result confirming process is started when the operation unit 37 receives the instruction of confirming the driving evaluation result from the driver. The driver evaluation result confirming process is the same as that in the first embodiment.

(Description of Example of Driving Evaluation Result Confirming Screen)

Figure 9:
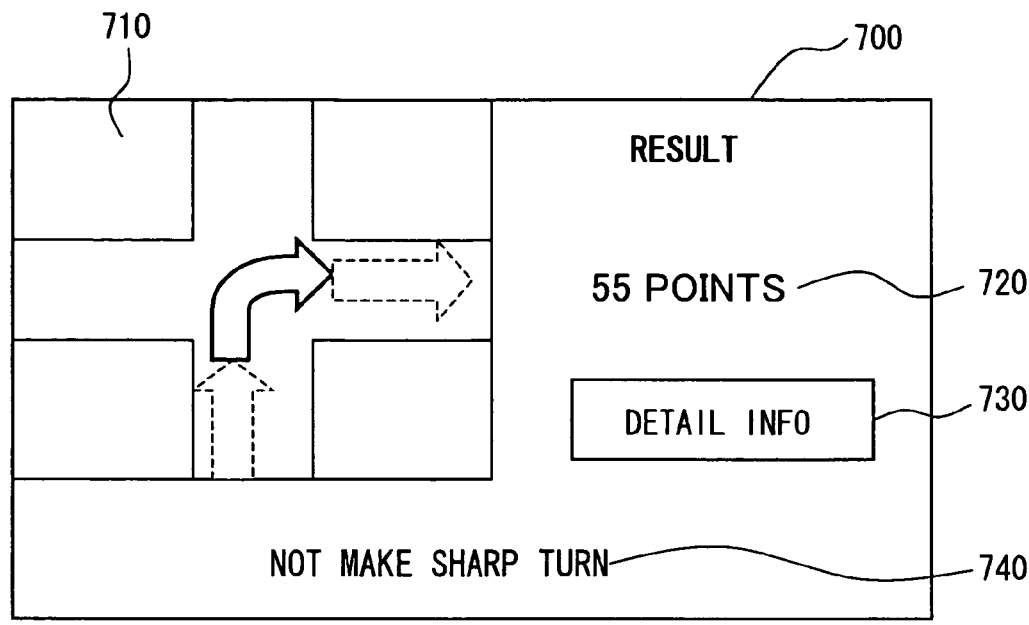
FIG. 9 shows an example of an evaluation result screen.

FIG. 9 shows an example of the driving evaluation result confirming screen displayed on the display 33. A screen 700 shown in FIG. 9 includes a schematic diagram 710 of an evaluation place, determination result points 720, a detail information button 730, and advice 740. The schematic diagram 710 is constructed on the basis of the map data obtained from the map DB 27. The determination result point 720 is calculated by subtracting the total of demerit points obtained at the time of evaluating the driving data (in step S460 in FIG. 2 and step S550 in FIG. 8) from 100 points. When the detail information button 730 is clicked, a detailed screen which will be described later is displayed. The advice 740 is "comment" corresponding to "travel pattern," "data item," and "direction of deviation" in each of which the demerit point is the highest in evaluation of the driving data (refer to the coefficient table of FIG. 5).

By displaying the driving evaluation result confirmation screen on the display 33, the driver can visually know drawbacks of his/her driving and general evaluation (points) of his/her driving.

Figure 10:
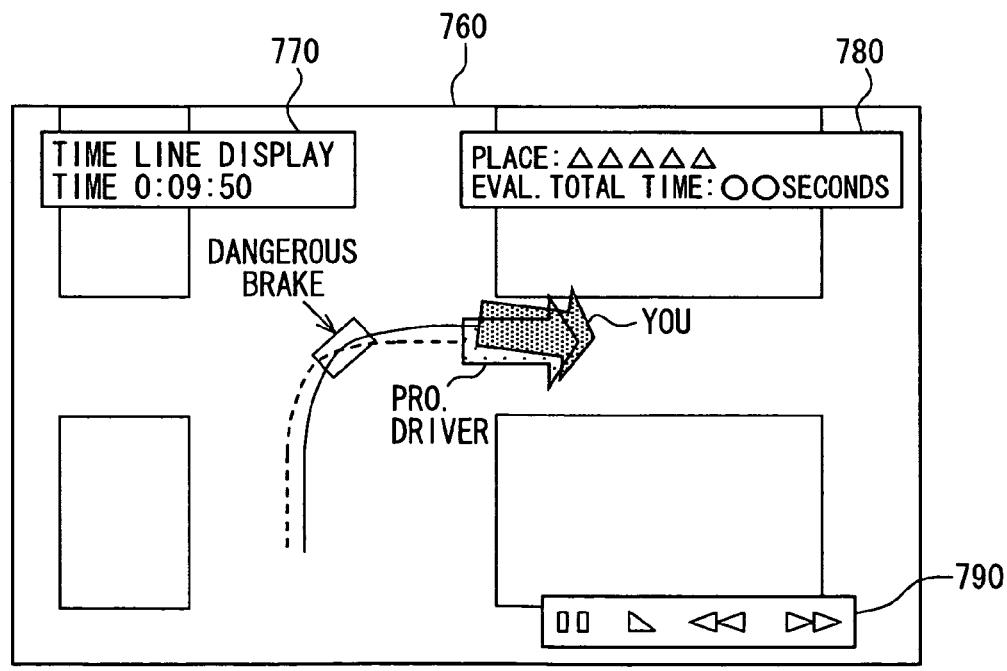
FIG. 10 shows an example of an evaluation result confirmation screen using two-dimensional animation.

FIG. 10 shows one frame in animation displayed when the detail information button 730 in FIG. 9 is clicked. In a screen 760 in FIG. 10, a travel locus (solid line) of the professional driver's vehicle and a travel locus (broken line) of a target vehicle are displayed together with vehicle models (arrows) on a two-dimensional map by computer graphics. The vehicle models of the professional driver's vehicle and the target vehicle are in different colors, so that each of the vehicle models can be identified by its color. The example of the screen 760 displays the position where a dangerous brake is applied in the target vehicle. The screen 760 displays a time line display area 770, a place and total time display area 780, and an operation panel area 790. The time line display area 770 displays the value of a time counter in animation. The place and total time display area 780 displays information of the place of the travel locus reproduced in the animation and information of total time of the animation. The user touches any of buttons in the operation panel 790 to execute a moving picture reproducing function assigned to each of the buttons. Concretely, functions of temporarily stop of a moving picture, playback, quick reverse playback, and quick traverse playback are assigned in order from the left button.

By displaying such a screen on the display 33, the driver can understand the motion of the vehicle of himself/herself objectively, and it is helpful to improve his/her driving techniques.

Figure 11:
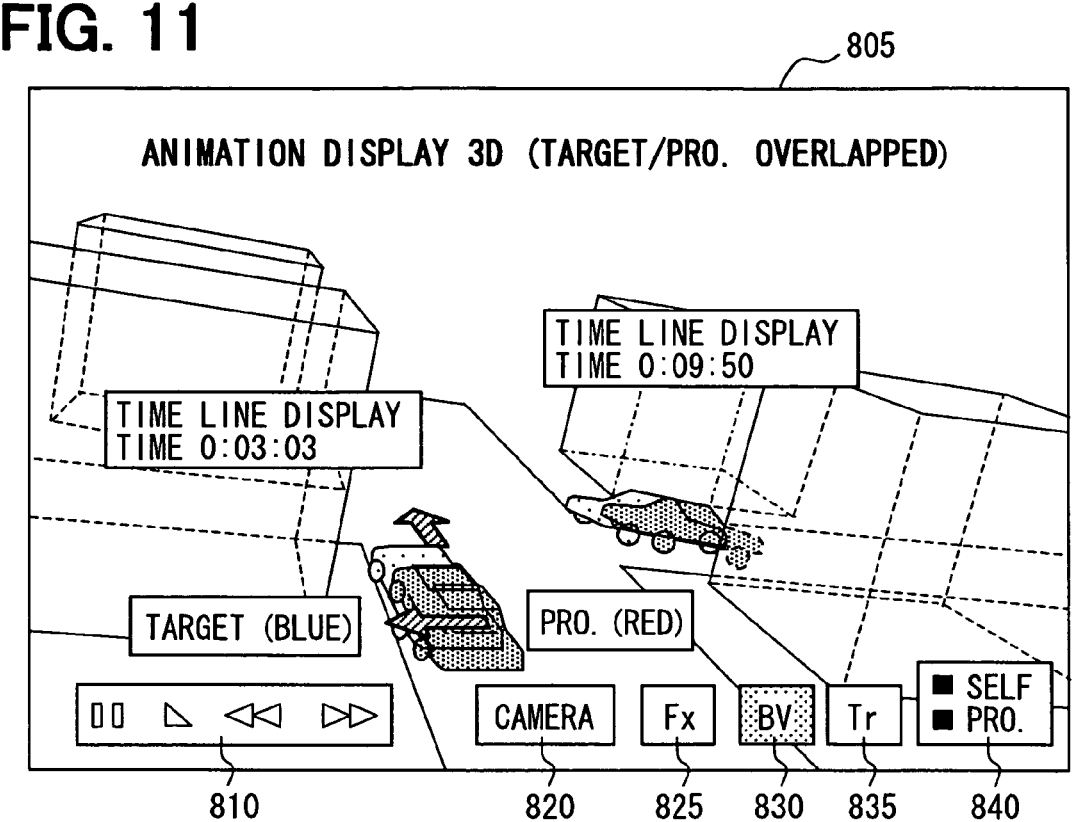
FIG. 11 shows an example of an evaluation result confirmation screen using three-dimensional animation.

FIG. 11 shows a composite screen of two frames (a frame at time 0:03:03 and a frame at time 0:09:50) in animation displayed when the detail information button 730 in FIG. 9 is clicked. In the composite frame, vehicle models of the target vehicle (self vehicle) and the professional driver's vehicle (pro) are displayed so as to be overlapped by computer graphics in a three-dimensional space. The viewpoint positions move in the air above in accordance with movement of the vehicles. The direction of deviation of the vehicle positions and the size are expressed by the direction and size of the arrow.

A screen 805 draws an operation panel area 810, a camera button 820, an Fx button 825, a BV button 830, a Tr button 835, and a vehicle selection button 840. The user touches any of buttons in the operation panel area 810 to execute a moving picture reproducing function assigned to each of the buttons. Concretely, functions of temporarily stop of a moving picture, playback, quick reverse playback, and quick traverse playback are assigned in order from the left button. When the camera button 820 is touched by the user, the screen is switched to a screen in which a video image captured by the camera unit 31 and stored and a video image captured in a viewpoint position of the professional driver are reproduced in the upper and lower parts. An example of the images will not be described. When the Fx button 825 is touched by the user, the viewpoint position in the animation can be fixed to a position in which the junction can be seen. When the BV button 830 is touched by the user, the viewpoint position in animation can be set to a bird's eye position. When the Tr button 835 is touched by the user, the viewpoint position in animation can be set to the position of the driver of a vehicle following the target vehicle. When the vehicle selection button 840 is touched by the user, display or non-display of each of the target vehicle and the professional driver's vehicle can be set independently.

By displaying such a screen on the display 33, the driver can understand the motion of the vehicle driven by himself/herself objectively. The driver can understand at a glance the difference between the motion of the vehicle driven by himself/herself and the motion of the professional driver's vehicle. It is helpful to improve driving techniques.

Figure 12:
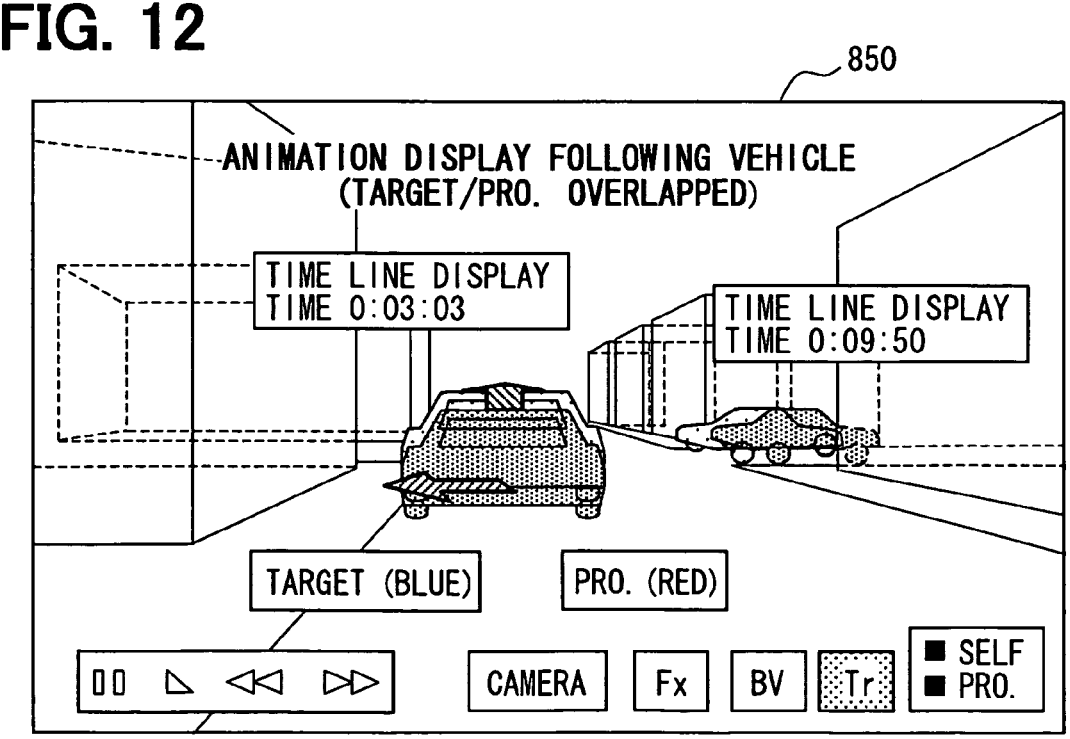
FIG. 12 shows an example of an evaluation result confirmation screen using three-dimensional animation.

A screen example 850 in FIG. 12 is obtained by combining two frames (a frame at time 0:03:03 and a frame at time 0:09:50) in animation displayed when the Tr button 835 in FIG. 11 is clicked by the user. In the screen example 850, vehicle models of the target vehicle (self vehicle) and the professional driver's vehicle (pro) are displayed so as to be overlapped by computer graphics in a three-dimensional space. The viewpoint position is a viewpoint of the driver of a virtual following vehicle (a following vehicle in a position after 5 m from the self vehicle position). The direction of a deviation of the vehicle position (the direction of a deviation in the travel direction and the direction of a deviation in the lateral direction with respect to the travel direction) and the size are expressed by the direction and size of the arrow.

By displaying such a screen on the display 33, the driver can understand the motion of the vehicle of himself or herself from the driver viewpoint, and can recognize a drawback or the like of the driving of himself or herself more intuitively.

Figure 13:
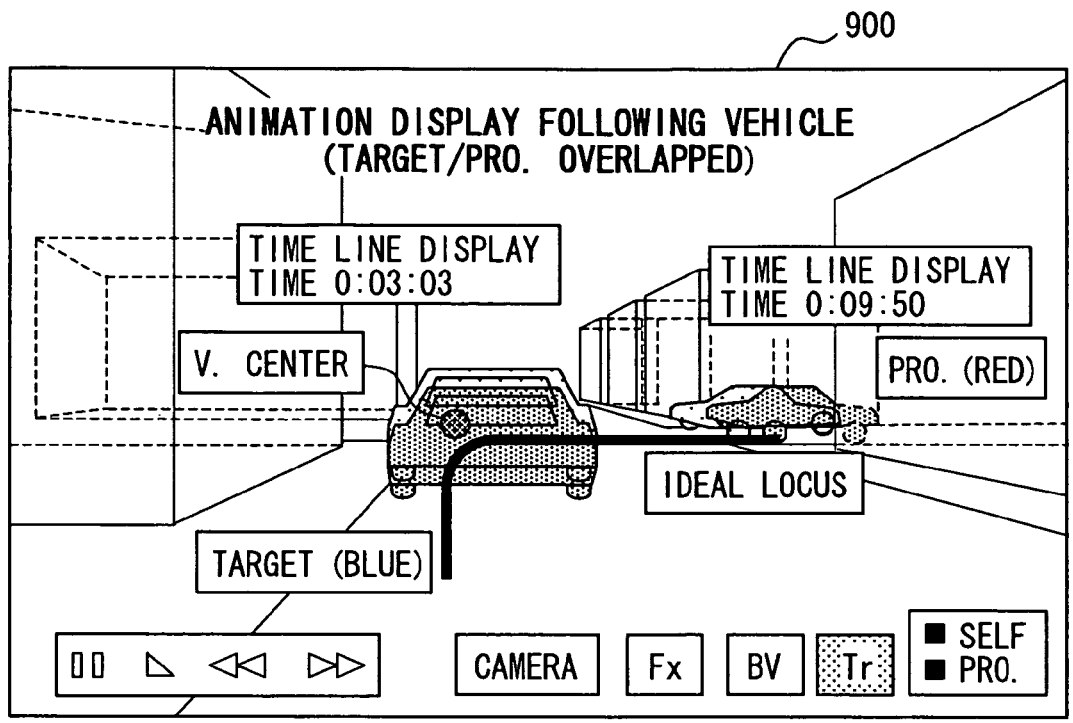
FIG. 13 shows an example of an evaluation result confirmation screen using three-dimensional animation.

A screen example 900 of FIG. 13, a locus 905 of a center point of a professional driver's vehicle and a center point of a target vehicle (self vehicle) are overlapped on the screen example 850 shown in FIG. 12.

By displaying such a screen on the display 33, the driver can accurately understand a deviation between the locus of the vehicle driven by himself or herself and the locus of the professional driver's vehicle, and it is helpful to improve driving techniques.

Figure 14:
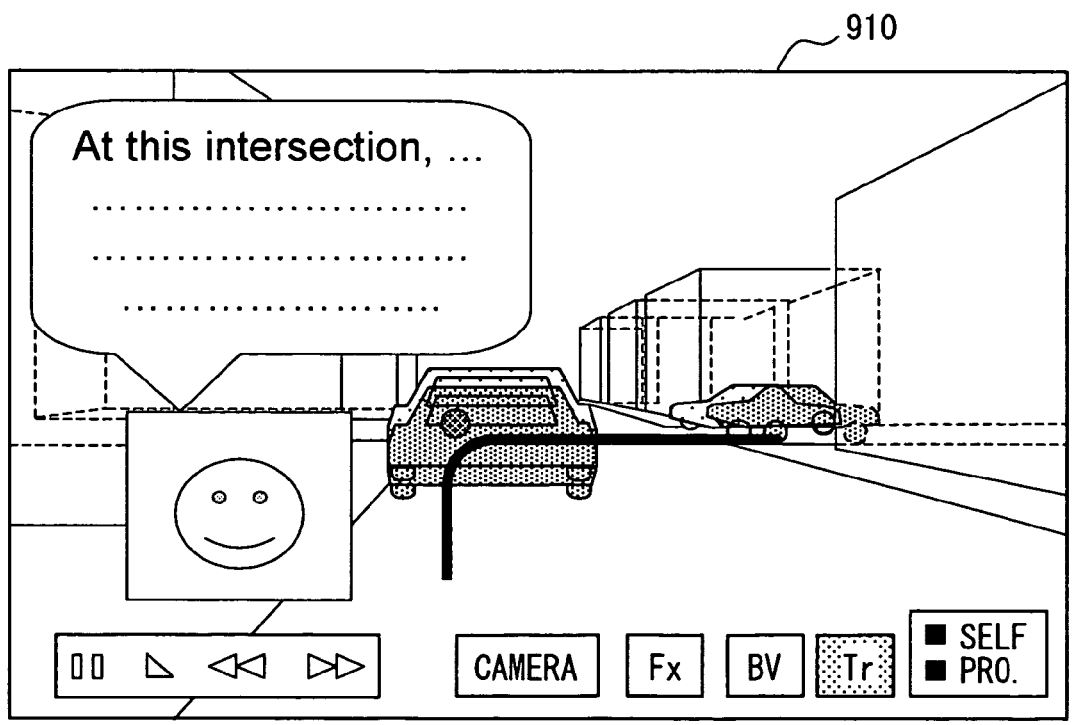
FIG. 14 shows an example of an evaluation result confirmation screen using three-dimensional animation.

A screen example 910 of FIG. 14 is obtained by overlapping an advice indication ("At this intersection, your decelerating timing was late. It is desirable to apply the brake at the timing shown now. When you apply the brake late, you have to abruptly move the steering wheel and, as a result, the locus was deviated"). The piece of advice is displayed immediately after animation according to the advice is reproduced.

When a piece of advice is displayed interlockingly with the animation reproduction timing as described above, the driver can understand the drawback in his/her driving closely with the countermeasure. Thus, the driver can improve his/her driving techniques more effectively.

Effects of the Embodiment

With the driving evaluation system 10 of the embodiment, as compared with a conventional system directed to make the driver recognize the degree of danger, the driver can understand the gap from an ideal travel locus more intuitively. The driver can easily recognize a correction amount of the driving operation of himself or herself. As a result, time required to learn proper driving operations and the like can be shortened.

As shown in FIGS. 11 to 14, the position relation between the target vehicle (self vehicle) and the professional driver's vehicle is displayed by using vehicle models, so that the driver can understand a situation to be corrected at a glance.

Since the vehicle models displayed on the display 33, reproduction speed of a front image, and the like can be controlled freely, for example, when the driver wishes to reproduce "the present scene" once again, it can be realized. Consequently, the driver can learn ideal driving operations more easily.

Figure 15A:
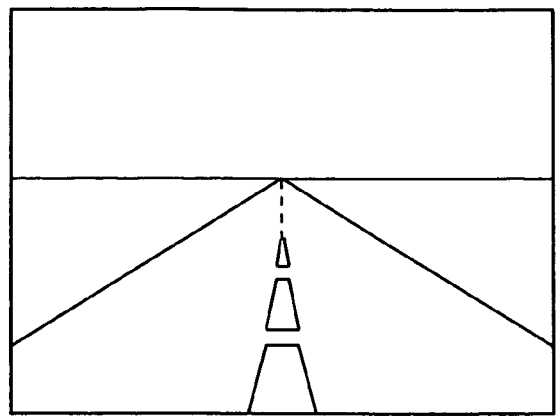
FIGS. 15A, 15B, and 15C are diagrams for illustrating a correction made at the time of displaying a picture taken on the spot.
Figure 15B:
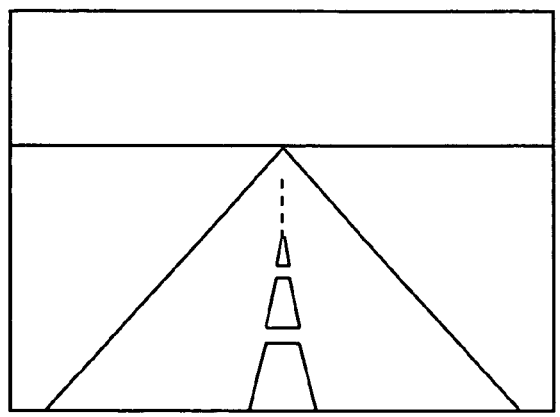
Figure 15C:
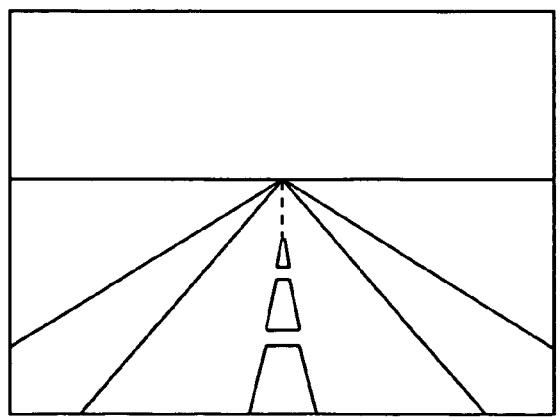

Other Embodiments (i) In the foregoing embodiment, a video image captured by the camera unit 31 and stored and a video image captured at the viewpoint position of the professional driver are reproduced in upper and lower screens, respectively. The images may be synthesized and displayed in a semi-permeable state. In this case, the video images may be seen differently according to the camera attaching positions. Concretely, in the case of combining a video image of FIG. 15A and a video image (FIG. 15B) captured by a camera attached in a position higher than the attachment position of the camera which captured the video image of FIG. 15A, the horizon positions are different from each other. Therefore, when the video images are combined as they are, the resultant video image looks unnatural. It is preferable to combine the video images so that their horizon positions match each other as shown in FIG. 15C by trimming or deforming the video images.

In such a manner, even in the case where the level of the position of capturing a front image in the target vehicle and that in a reference vehicle are different from each other, images can be combined and displayed without giving strange feeling.

(ii) Steering wheel operating states or brake operating states of the driver and the professional driver can be also superimposed on each of the screens (FIGS. 11 to 14) of the foregoing embodiment. A display color of the vehicle model may be changed according to the timings (too early/too late) of the operations or according to the travel position (which is the right or left in the travel direction) of a target vehicle with respect to the travel locus of the professional driver's vehicle.

In such a manner, the driver can understand the travel positions of both the target vehicle and the reference vehicle and also the driving states, and can know a countermeasure for ideal driving more intuitively. For example, when the interval between the target vehicle and the reference vehicle starts widening in the travel direction, the driver can know immediately that the cause is the brake operation or the throttle operation.

Figure 16:
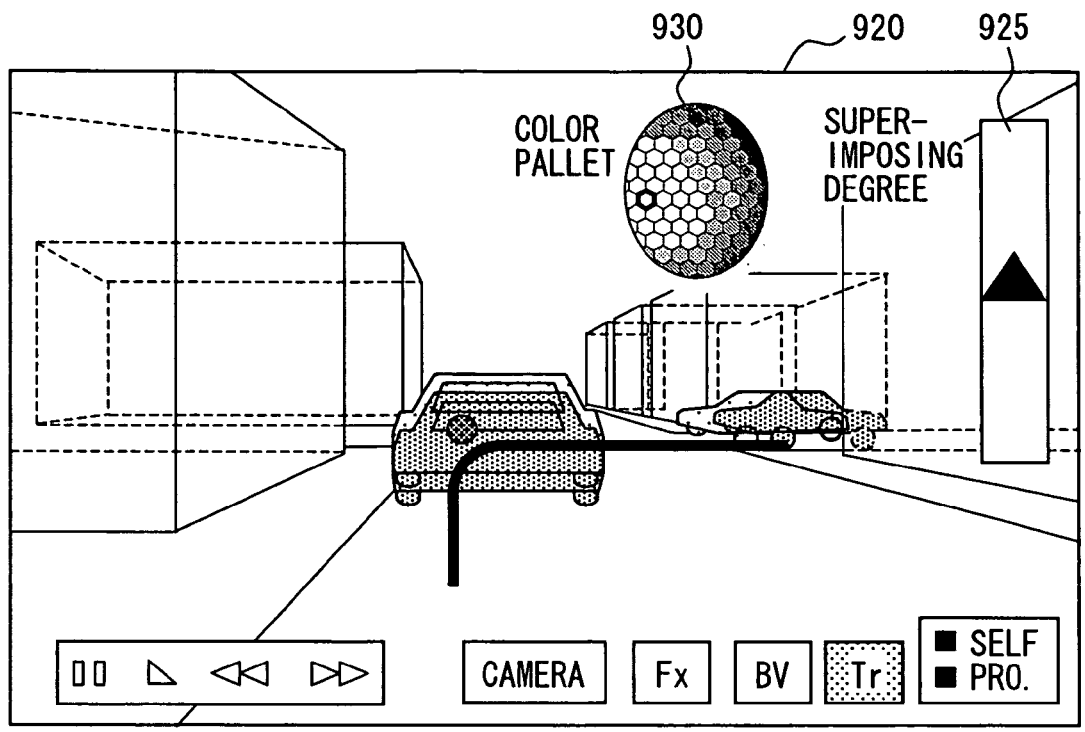
FIG. 16 shows an example of a screen for setting colors and the superimposing degree.

(iii) The color and the superimposing degree of the vehicle model in each of the screens (FIGS. 11 to 14) of the foregoing embodiment may be changed. Concretely, as in a screen example 920 shown in FIG. 16, a color pallet 930 and a superimposing-degree setting bar 925 are displayed. A vehicle model being selected is set in a color selected on the color pallet 930, or set at the superimposing degree according to the level selected on the superimposing-degree setting bar 925.

By setting, for example, the superimposing degree of the model of the target vehicle to be lower than that of the model of the reference vehicle in accordance with the intention of the driver, the model of the target vehicle can be made more conspicuous, so that the travel state of the target vehicle can be more easily recognized. By setting, for example, the superimposing degree of the model of the target vehicle to be higher than that of the model of the reference vehicle, the model of the reference vehicle can be made more conspicuous, so that the travel state of the reference vehicle can be more easily recognized.

Figure 17A:
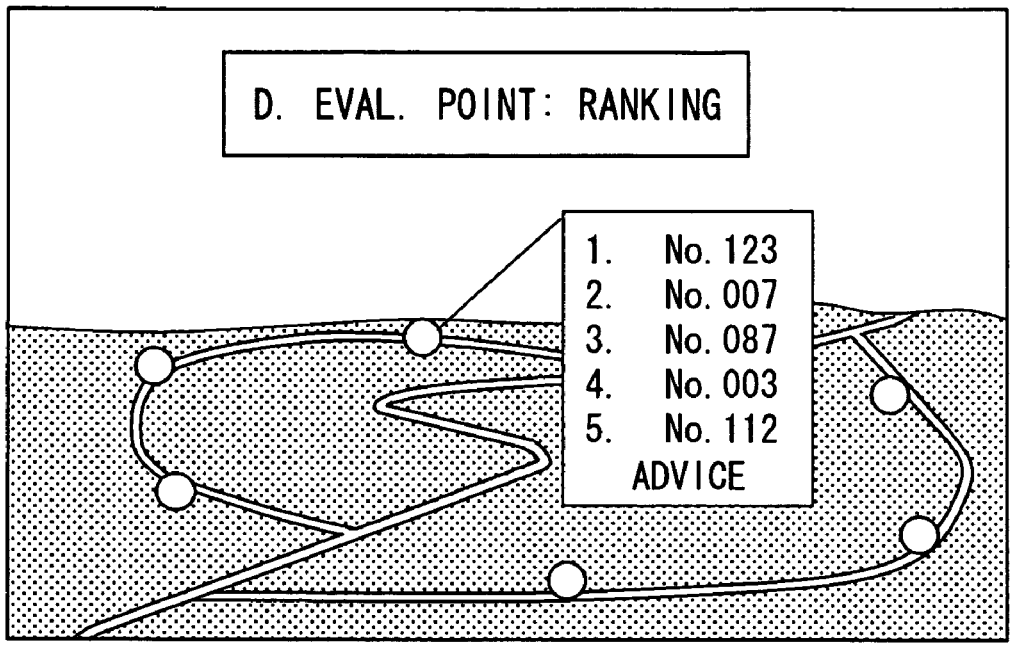
FIGS. 17A and 17B show screen examples at the time of setting a driving evaluation point.
Figure 17B:
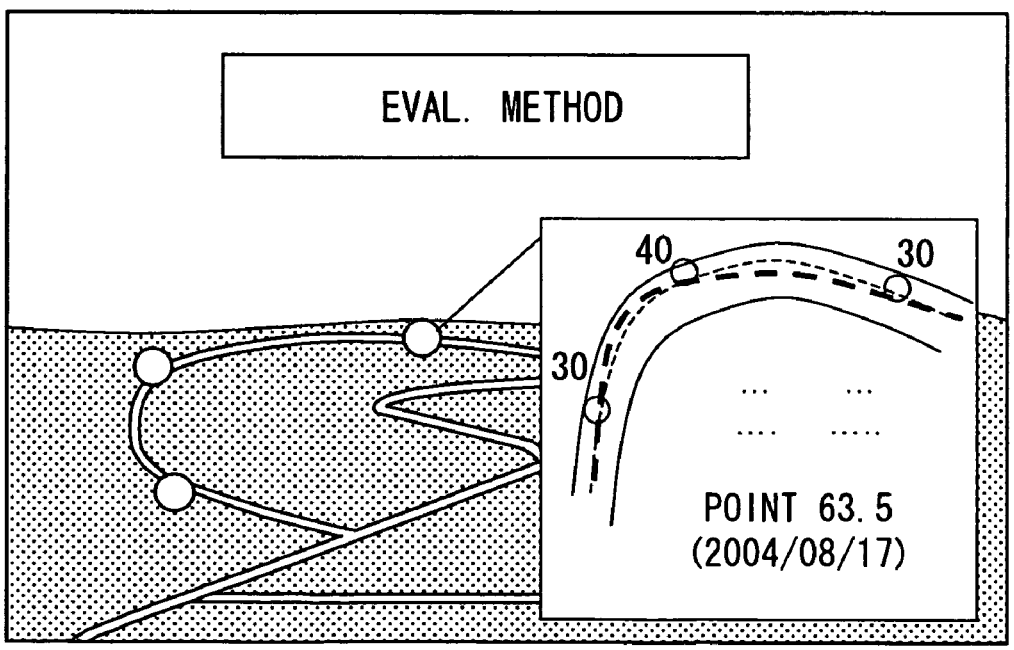

(iv) By touching an evaluation point for three seconds as shown in FIG. 17A in a screen (refer to FIG. 3A) for determining the driving evaluation point, the ranking at the evaluation point may be displayed. By touching an evaluation point for ten seconds, information on the evaluating method at the evaluation point may be displayed. After travel information is obtained, it is preferable to display points as well (refer to FIG. 17B).

(v) In the foregoing embodiment, the driving evaluation apparatus 21 obtains professional driver's data and professional driver's images from the server 11. It is also possible to pre-store the data in a self apparatus and use it. In such a case, communication time to obtain the data becomes unnecessary, and the communication cost can be also suppressed.

Individual processing or execution explained in the above embodiment, e.g., using the flowchart can be constructed as a unit or means in a program stored in the ROM or the like and executed by using the CPU or the like.

It will be obvious to those skilled in the art that various changes may be made in the above-described embodiments of the present invention. However, the scope of the present invention should be determined by the following claims.

What is claimed is:

1. A driving evaluation apparatus comprising:
an input information storing unit that stores, as input information in time sequence based on an instruction, the input information including (i) travel information of a target vehicle, and (ii) driving operation information of a driver of the target vehicle;
a reference information storing unit that stores reference information in time sequence, the reference information including (i) travel information of a reference vehicle, and (ii) driving operation information of a driver of the reference vehicle;
a display unit that includes a plurality of pixels and displays information in accordance with states of the pixels; and
a control unit that
outputs a start instruction and an end instruction of input of the travel information to the input information storing unit and,
displays on the display unit both a travel locus of travel positions of the target vehicle in time sequence and a travel locus of travel positions of the reference vehicle in time sequence, thereby allowing easy recognition of a deviation in a lateral direction of the target vehicle between the travel locus of the target vehicle and the travel locus of the reference vehicle, based on the input information stored in the input information storing unit and the reference information stored in the reference information storing unit, to allow a user to compare the travel positions,
wherein:
when the travel locus of the target vehicle and the travel locus of the reference vehicle are displayed on the display unit, the control unit also displays the driving operations of the drivers corresponding to the travel locus of the target vehicle and the travel locus of the reference vehicle on the display unit based on the driving operation information stored in the input information storing unit and the driving operation information stored in the reference information storing unit;
the control unit simultaneously displays superimposable vehicle models corresponding to the target vehicle and the reference vehicle in positions in the display unit according to the travel positions while expressing a size of the deviation in the lateral direction of the target vehicle with respect to the reference vehicle,
the vehicle models being displayed such that at least two of the vehicle models corresponding to the target vehicle and the reference vehicle are superimposed in a three-dimensional space and seen from a viewpoint position at a predetermined distance rearward of the target vehicle; and
the control unit further changes a display color of the vehicle model of the target vehicle based on whether the travel position of the target vehicle is on a right side or a left side in a travel direction with respect to the travel locus of the reference vehicle.

2. The driving evaluation apparatus according to claim 1, further comprising
a superimposing-degree information accepting unit for accepting information on a superimposing degree of each of the vehicle models from the user, wherein the control unit displays each of the vehicle models on the display unit based on the information on the superimposing degree received by the superimposing-degree information accepting unit.

3. The driving evaluation apparatus according to claim 1, wherein
the control unit changes a display color of the vehicle model of the target vehicle in accordance with a steering operation start timing of the driver of the target vehicle with respect to a steering operation start timing of the driver of the reference vehicle.

4. The driving evaluation apparatus according to claim 1, wherein
the control unit changes a display color of the vehicle model of the target vehicle in accordance with an acceleration/deceleration start timing of the driver of the target vehicle with respect to an acceleration/deceleration start timing of the driver of the reference vehicle.

5. The driving evaluation apparatus according to claim 1, further comprising
a viewpoint position information accepting unit for accepting viewpoint position information of a viewpoint position in virtual three-dimensional display from the user, wherein
the control unit displays the vehicle model displayed on the display unit by a virtual three-dimensional method using, as a viewpoint, a viewpoint position corresponding to the viewpoint position information accepted by the viewpoint position information accepting unit.

6. The driving evaluation apparatus according to claim 5, wherein
the viewpoint position information accepting unit selectively accepts the viewpoint position information corresponding to a viewpoint position of a driver of a vehicle following the target vehicle.

7. The driving evaluation apparatus according to claim 1, wherein
a unit in a time base control for pixel states in the display unit is a frame,
the apparatus further comprises a rewrite information accepting unit for accepting information on speed of rewriting frames in the display unit and a rewriting direction on a time base from the user, and
the control unit controls a display frame to be displayed on the display unit based on the information accepted by the rewrite information accepting unit.

8. The driving evaluation apparatus according to claim 1, further comprising
a position information obtaining unit for obtaining position information for specifying a present position of the target vehicle, wherein
based on the position information obtained by the position information obtaining unit, the control unit outputs the start instruction when the target vehicle reaches a start point of a predetermined section and outputs the end instruction when the target vehicle reaches an end point of the predetermined section.

9. The driving evaluation apparatus according to claim 8, further comprising:
a section information storing unit for storing a plurality of pieces of information of the predetermined section used when the control unit determines the start instruction and the end instruction; and
a specific information accepting unit for accepting specific information for specifying information in the plurality of pieces of information of the predetermined section stored in the section information storing unit from the driver of the target vehicle, wherein the control unit uses a section corresponding to the specific information accepted by the specific information accepting unit as the predetermined section used when the start instruction and the end instruction are determined.

10. The driving evaluation apparatus according to claim 1, further comprising a communication unit for performing communication with a server, wherein based on the input information stored in the input information storing unit and the reference information stored in the reference information storing unit, the control unit evaluates competency of the driver of the target vehicle and transmits an evaluation result together with information specifying the target vehicle or information specifying the driver of the target vehicle to the server via the communication unit.

11. The driving evaluation apparatus according to claim 10, wherein the control unit receives ranking information based on the evaluation result from the server via the communication unit and displays information on the display unit.

12. A server comprising:

a server-side communication unit that performs communication with the driving evaluation apparatus according to claim 11;

a competency evaluation result holding unit that holds a list of competency evaluation results of drivers; and a server-side control unit that
adds a competency evaluation result of a driver, which is received via the server-side communication unit to the competency evaluation result holding unit,
determines a rank to which the received evaluation result corresponds, and
transmits a determination result as ranking information to the driving evaluation apparatus via the server-side communication unit.

13. The driving evaluation apparatus according to claim 1, further comprising:

an input image storing unit that stores input images in time sequence based on an instruction, the input images including (i) front images of the target vehicle and (ii) driving operation images of the driver of the target vehicle; and a reference image storing unit that stores reference images in time sequence, the reference images including (i) front images of the reference vehicle and (ii) driving operation images of the driver of the reference vehicle;

the control unit being configured to
output a start instruction and an end instruction of input of the front image to the input image storing unit and
display the input images stored in the input image storing unit and the reference images stored in the reference image storing unit in time sequence on the display unit while expressing a deviation in a lateral direction with respect to a travel direction of the target vehicle between the target vehicle and the reference vehicle, to allow a user to compare the images,
wherein
when front images of the vehicles are displayed on the display unit, the control unit also displays the driving operation image stored in the input image storing unit and the driving operation image stored in the reference image storing unit on the display unit so as to be associated with the front image of each of the vehicles by synthesizing in a semi-permeable state.

14. The driving evaluation apparatus according to claim 13, wherein the control unit corrects the front image of the reference vehicle so that a horizon position of the front image of the target vehicle and that of the front image of the reference image coincide with each other, and displays resultant images on the display unit.

15. The driving evaluation apparatus according to claim 13, wherein a unit in a time base control for pixel states in the display unit is a frame, the apparatus further comprises a rewrite information accepting unit for accepting information on speed of rewriting frames in the display unit and a rewriting direction on a time base from the user, and the control unit controls a display frame to be displayed on the display unit based on the information accepted by the rewrite information accepting unit.

16. The driving evaluation apparatus according to claim 13, further comprising a position information obtaining unit for obtaining position information for specifying a present position of the target vehicle, wherein based on the position information obtained by the position information obtaining unit, the control unit outputs the start instruction when the target vehicle reaches a start point of a predetermined section and outputs the end instruction when the target vehicle reaches an end point of the predetermined section.

17. The driving evaluation apparatus according to claim 16, further comprising:

a section information storing unit for storing a plurality of pieces of information of the predetermined section used when the control unit determines the start instruction and the end instruction; and a specific information accepting unit for accepting specific information for specifying information in the plurality of pieces of information of the predetermined section stored in the section information storing unit from the driver of the target vehicle, wherein the control unit uses a section corresponding to the specific information accepted by the specific information accepting unit as the predetermined section used when the start instruction and the end instruction are determined.

18. The driving evaluation apparatus according to claim 1, wherein:

the control unit acquires a road range for evaluating a driving operation of the target vehicle, and the control unit outputs the start instruction and the end instruction of input of the travel information to the input information storing unit based on the road range acquired by the driving evaluation road range acquisition unit.

19. A driving evaluation apparatus for displaying on a display unit a driving evaluation of a target vehicle driven by a target driver, the apparatus comprising:

an input information storing unit that stores, as input information in time sequence based on an instruction, the input information including (i) travel information of the target vehicle, and (ii) driving operation information of the target driver;

a reference information storing unit that stores reference information in time sequence, the reference information including (i) travel information of a reference vehicle, and (ii) driving operation information of a reference driver of the reference vehicle; and a control unit that outputs a start instruction and an end instruction of input of the travel information to the input information storing unit, and displays on the display unit
   (i) both a target travel locus of the target vehicle and a reference travel locus of the reference vehicle simultaneously, thereby allowing easy recognition of a deviation in a lateral direction of the target locus against the reference locus based on the stored travel information of the target vehicle and the reference vehicle,
   (ii) both driving operations of the target driver corresponding to the target travel locus and driving operations of the reference driver based on the stored driving operation information of the target driver and the reference driver, and
   (iii) superimposable vehicle models corresponding to the target vehicle and the reference vehicle in positions in the display unit according to certain travel positions, the vehicle models being displayed such that at least two of the vehicle models corresponding to the target vehicle and the reference vehicle are superimposed in a three-dimensional space and seen from a viewpoint position at a predetermined distance rearward of the target vehicle, the control unit being further configured to
   express a size of the deviation in the lateral direction between the target vehicle and the reference vehicle when the superimposable vehicle modes are displayed while changing a display color of the vehicle model of the target vehicle based on whether the travel position of the target vehicle is on a right side or a left side in a travel direction with respect to the travel locus of the reference vehicle.

\* \* \* \* \*